United States Patent [19]  [11] 4,146,704
Seki et al.  [45] Mar. 27, 1979

[54] METHOD FOR MANUFACTURE OF FINELY POWDERED POLYAMIDE RESIN

[75] Inventors: Terunobu Seki, Tokyo; Kosei Ri, Kawagoe, both of Japan

[73] Assignee: Kabushiki Kaisha Maruki Shokai, Tokyo, Japan

[21] Appl. No.: 854,216

[22] Filed: Nov. 23, 1977

Related U.S. Application Data

[63] Continuation of Ser. No. 748,143, Dec. 6, 1976, abandoned.

[30] Foreign Application Priority Data

Sep. 24, 1976 [JP] Japan .................................. 51-113603

[51] Int. Cl.² ............................................. C08G 69/46
[52] U.S. Cl. ...................................... 528/323; 260/2.3; 528/335; 528/496; 528/499
[58] Field of Search ..................... 260/78 S, 78 R, 2.3; 528/323, 335, 496, 499

[56] References Cited

U.S. PATENT DOCUMENTS 2,742,440  4/1956  Stott et al. ........................... 260/78 S
3,679,638  7/1972  Korsgen et al. ..................... 260/78 S Primary Examiner—Harold D. Anderson
Attorney, Agent, or Firm—Stevens, Davis, Miller & Mosher

[57] ABSTRACT

A finely powdered polyamide resin is manufactured by a method which comprises dissolving a polyamide resin in a water-containing isopropyl alcohol under increased pressure at temperatures of 150° to 155° C. and subjecting the resultant solution to vigorous agitation while cooling for thereby educing therein finely divided polyamide resin particles of diameters of the order of microns.

4 Claims, No Drawings

METHOD FOR MANUFACTURE OF FINELY POWDERED POLYAMIDE RESIN

This is a Continuation of application Ser. No. 748,143 filed Dec. 6, 1976, now abandoned.

BACKGROUND OF THE INVENTION (a) Field of the Invention

This invention relates to a method for the manufacture of a finely powdered polyamide resin.

(b) Description of the Prior Art

Makers specializing in the production of raw materials for nylon and those specializing in the production of plastics are in a position to manufacture finely powdered polyamide resins directly from polyamide resins. Once polyamide resins have been processed into textile fibers and shaped plastic articles, however, it is extremely difficult to treat such shaped polyamide articles to reclaim finely powdered polyamide resins therefrom for full exploitation. If manufacture of such resins is successfully managed, they will prove to be expensive. Such is the true status of affairs prevalent in the art. For example, a shaped article of polyamide resin may be dissolved in a good solvent, namely an organic acid solvent such as 60% formic acid or glacial acetic acid or an organic solvent such as a phenol (phenol or meta-cresol) and the resultant solution poured into water to educe therein fine polyamide particles. The fine polyamide particles, however, begin at once to cohere mutually and consequently form a conglomerate, making it extremely difficult to obtain finely divided particles intact. If a polyamide conglomerate consequently formed is converted into a finely powdered resin by an additional mechanical treatment, the product proves to be very expensive. Such is the true state of affairs.

SUMMARY OF THE INVENTION

This invention has successfully materialized an easy and inexpensive reclamation of useful, finely powdered polyamide resin directly through a treatment of a shaped article of polyamide resin. To be specific, the present invention relates to a method for the manufacture of a finely powdered polyamide resin, which comprises dissolving a polyamide resin in a solvent to a concentration of 3 to 10% by weight of this solvent under increased pressure at temperatures of 150° to 155° C., said solvent being an isopropyl alcohol having a water content of 12 to 65%, of that solvent preferably 20 to 50%, by weight, subjecting the resultant solution to vigorous agitation while under a cooled condition particularly at temperatures between 100° C. and 80° C., thereby educing therein finely divided polyamide resin particles and thereafter separating the fine resin particles by filtration.

DETAILED DESCRIPTION OF THE INVENTION

In the present invention, the term "polyamide resin" refers to resins as the principal raw material for a synthetic fiber "nylon", particularly ε-caprolactam polymer or hexamethylenediamine adipamide polymer.

As the raw material for the polyamide resin aimed at by the present invention, shaped articles formed preponderantly of nylon-6 (ε-caprolactam polymer) or nylon-66 (hexamethylenediamine adipamide polymer) resin are advantageously used. Refuse fibers obtained directly from a nylon production plant are inexpensive and, therefore, make an advantageous raw material. Rejected woven fabrics, rejected shaped products of resin and other similar wastes are also usable. The water-containing isopropyl alcohol can effectively be used as the solvent in so far as the water content falls in the range of from 12 to 65% by weight of the solvent. If the water content of this solvent fails to reach the lower limit 12% by weight or exceeds the upper limit 65% by weight, however, the polyamide resin is not soluble in the solvent. With due consideration to the optimum range of from 3 to 10% by weight of the solvent prescribed for the polyamide resin concentration, desired eduction of finely divided resin particles in the water is attained most stably and most advantageously by keeping the water content of the solvent within the range of from 20 to 50% by weight of the solvent.

As regards the conditions for dissolution, solution of the polyamide resin in the solvent of isopropyl alcohol containing 20 to 50% by weight of water is attained with advantageous results when the concentration of polyamide resin is kept within the range of from 3 to 10% by weight. If the polyamide resin concentration fails to reach the lower limit 3% by weight, then the efficiency of dissolution is degraded despite a reduction in the time required for dissolution. If conversely the concentration exceeds the upper limit 10% by weight, then the time required for dissolution of the resin is elongated and the viscosity of the solution is increased so much as to render the handling of the solution particularly difficult at lowered temperatures. This dissolution is effected by use of a pressure kettle designed for a normal working pressure of 10 kg/cm$^2$ (by gauge pressure), with the optimum temperature fixed within 150°–155° C. At 155° C., the internal pressure of the pressure kettle is about 9.5 kg/cm$^2$. At this temperature, the resin and the solvent are agitated for about 7 to 20 minutes to ensure uniform solution. As regards the conditions for cooling and agitation of the solution, the solution obtained is gradually cooled at a temperature decrease rate of about 10° C. per 10 minutes with the agitation of the solution continued. As the temperature falls to about 100° C., finely divided particles of polyamide resin begin to educe. From this point until 80° C., the solution is given vigorous agitation so that the educed finely divided particles will be prevented from cohering and their particle diameters will consequently be uniformized and minimized. Under these conditions, the agitation is carried out by adjusting the revolution number of the agitator's impellers in the range of from 600 to 1,200 rpm.

After the cooling, the educed finely divided particles are separated by means of centrifugation and the resultant filtrate which is the solvent is recovered and put to reuse. The finely divided particles of polyamide resin thus separated are dried by using a vacuum drier.

The present invention is directed to a method for reclaiming polyamide resin in a finely powdered form directly from a shaped article of polyamide resin through a treatment thereof. To be more specific, this invention relates to a method for the manufacture of a finely powdered polyamide resin which comprises dissolving a shaped article for polyamide resin under increased pressure at temperatures of from 150° to 155° C. in a solvent which is isopropyl alcohol containing water at a concentration of 12 to 65%, preferably 20 to 50%, by weight of the solvent, then simultaneously agitating and cooling the resultant solution, thereby educing therein finely divided polyamide resin particles and thereafter separating the educed finely divided particles. Thus, this is a manufacturing method of entirely novel principle.

The method of the present invention can easily be practiced commercially and enjoys the advantage that both equipment cost and operation cost are low.

The finely divided polyamide resin particles produced by the method of the present invention enjoy an outstanding uniformity of particle diameters, which are distributed within the range of from about 2 to about 10 microns. What is more, they are obtained in a yield of more than 90%.

Examples of the uses to be found for the finely divided polyamide resin particles produced by this invention include agents for surface treatment of vinyl chloride resin leather goods, mold materials (as substitutes for gypsum) for ceramic articles, basal materials for cosmetic articles, dispersants for pigments, additives for lubricants and additives for cutting oils.

Preferred embodiments of this invention will be cited.

EXAMPLE 1

In a pressure reaction kettle provided with a stirrer and having an inner volume of 100 liters, 2.4 kg of refuse fiber of nylon-6 were placed and 52.5 kg of isopropyl alcohol containing 46% by weight of water was poured therein as the solvent. Then the reaction kettle was heated to 155° C., at which temperature the heating was discontinued. At this point, the interior pressure of the reaction kettle was 9.5 kg/cm$^2$.

While the temperature fell from 155° C. to 150° C., the contents of the kettle were agitated for 7 minutes to facilitate solution and obtain a uniform solution. Subsequently, the solution was allowed to cool off. While the temperature fell from 100° C. to 80° C., the solution was kept under vigorous agitation. Consequently finely divided nylon-6 particles were educed in the solution. At room temperature under atmospheric pressure, the finely divided particles were separated by centrifugation. The filtrate or solvent was recovered and reused.

The finely divided particles thus separated were dried in a vacuum drier for 1.5 hours. The conditions for the vacuum drying were 5 to 10 mmHg of pressure and 45° C. to 85° C. of temperature.

The finely powdered polyamide resin was found to have a particle diameter in the range of from 2 to 6 microns. The yield of the product was calculated to be 95% of the charged material.

EXAMPLE 2

The same pressure reaction kettle as involved in Example 1 was charged with 2.8 kg of refuse fibers of nylon-66 and 42.5 kg of isopropyl alcohol containing 35% by weight of water. The reaction kettle was heated to 155° C., at which temperature the heating was discontinued. The contents were treated to become a uniform solution. Subsequently, the solution was gradually cooled and subjected to vigorous agitation as in Example 1.

Consequently, there ensued eduction of finely divided nylon-66 particles. From this point on, the remainder of the procedures of Example 1 were followed. The finely divided polyamide resin particles obtained after the drying step were found to have a particle diameter in the range of from 2 to 10 microns. The yield was calculated to be 93% of the charged material.

What is claimed is:

1. A method for the manufacture of finely powdered nylon polyamide resin particles having diameters of from 2–10 microns comprising adding the polyamide resin to a solvent of an isopropyl alcohol containing 12 to 65% water by weight of said solvent at a polyamide resin concentration of 3–10% by weight of solvent, dissolving said polyamide resin in said solvent by heating said solvent containing said polyamide to a temperature of 150° to 155° C. under greater than atmospheric pressure to form a solution of polyamide in solvent, cooling the solution to a temperature of 80° to 100° C. while subjecting said cooling solution to vigorous agitation, thereby precipitating said polyamide particles, and separating the particles.

2. The method according to claim 1 wherein the water content of the isopropyl alcohol solvent is in the range of from 20 to 50% by weight of said solvent.

3. The method according to claim 1, wherein said vigorous agitation is effected by operating the agitator so that the revolution number of the agitator's impellers is in the range of 600 to 1,200 rpm.

4. The method according to claim 1, wherein the polyamide resin is poly-ε-caprolactam or poly-hexamethylenediamine adipamide.